United States Patent
Tazreiter

(10) Patent No.: US 7,516,703 B2
(45) Date of Patent: Apr. 14, 2009

(54) RETRACTABLE STEP

(75) Inventor: Andreas Tazreiter, Waidhofen (AT)

(73) Assignee: Knorr-Bremse AG, Munich (DE)

( * ) Notice: Subject to any disclaimer, the term of this patent is extended or adjusted under 35 U.S.C. 154(b) by 210 days.

(21) Appl. No.: 10/550,012

(22) PCT Filed: Feb. 20, 2004

(86) PCT No.: PCT/EP2004/001667

§ 371 (c)(1), (2), (4) Date: Dec. 27, 2006

(87) PCT Pub. No.: WO2004/085222

PCT Pub. Date: Oct. 7, 2004

(65) Prior Publication Data

US 2007/0200313 A1    Aug. 30, 2007

(30) Foreign Application Priority Data

Mar. 25, 2003    (AT) ................. A 472/2003

(51) Int. Cl.
*B61D 23/00* (2006.01)
*B60R 3/00* (2006.01)

(52) U.S. Cl. .............. 105/443; 105/444; 280/163

(58) Field of Classification Search .......... 280/163, 280/164, 165, 166; 105/447, 443, 444, 445, 105/446, 449

See application file for complete search history.

(56) References Cited

U.S. PATENT DOCUMENTS

| | | | | |
|---|---|---|---|---|
| 5,508,511 A * | 4/1996 | Zur et al. ............. | 250/222.1 |
| 6,339,305 B1 * | 1/2002 | Ishihara et al. .......... | 318/445 |
| 6,341,563 B1 * | 1/2002 | Gal et al. ............. | 104/28 |
| 6,344,642 B1 * | 2/2002 | Agam et al. ........... | 250/221 |
| 6,746,033 B1 * | 6/2004 | McDaniel .............. | 280/166 |
| 6,782,759 B2 * | 8/2004 | Shank et al. ........... | 73/780 |
| 6,834,875 B2 * | 12/2004 | Leitner et al. .......... | 280/166 |
| 7,163,221 B2 * | 1/2007 | Leitner ................. | 280/166 |
| 7,293,467 B2 * | 11/2007 | Shank et al. ........... | 73/780 |
| 7,367,574 B2 * | 5/2008 | Leitner ................. | 280/166 |
| 2005/0151340 A1 * | 7/2005 | Leitner ................. | 280/166 |
| 2005/0167941 A1 * | 8/2005 | Garland et al. ......... | 280/166 |
| 2006/0175791 A1 * | 8/2006 | Kaempe ................ | 280/166 |
| 2006/0245883 A1 * | 11/2006 | Fontaine et al. ........ | 414/537 |
| 2006/0267308 A1 * | 11/2006 | Decker et al. .......... | 280/166 |
| 2007/0200313 A1 * | 8/2007 | Tazreiter .............. | 280/166 |
| 2008/0250966 A1 * | 10/2008 | Hirtenlehner .......... | 105/444 |

FOREIGN PATENT DOCUMENTS

| | | |
|---|---|---|
| DE | 37 08 498 | 9/1988 |
| DE | 100 43 561 | 3/2002 |
| EP | 0 641 701 | 3/1995 |
| FR | 2165030 | 8/1973 |
| GB | 1410615 | 10/1975 |
| GB | 2 223 211 | 4/1990 |

* cited by examiner

*Primary Examiner*—Jason C Smith
(74) *Attorney, Agent, or Firm*—Barnes & Thornburg LLP

(57) ABSTRACT

A retractable step for entering and exiting rail vehicles. The retractable step has a surface which can be walked upon and is configured to be extended in an essentially linear direction to bridge a gap between the rail vehicle and a platform. The retractable step includes a leading edge and has at least one sensor configured to prevent a collision with objects during an extension operation of the retractable step. The strip is movably connected to the retractable step and extends over an entire length L of the retractable step.

5 Claims, 4 Drawing Sheets

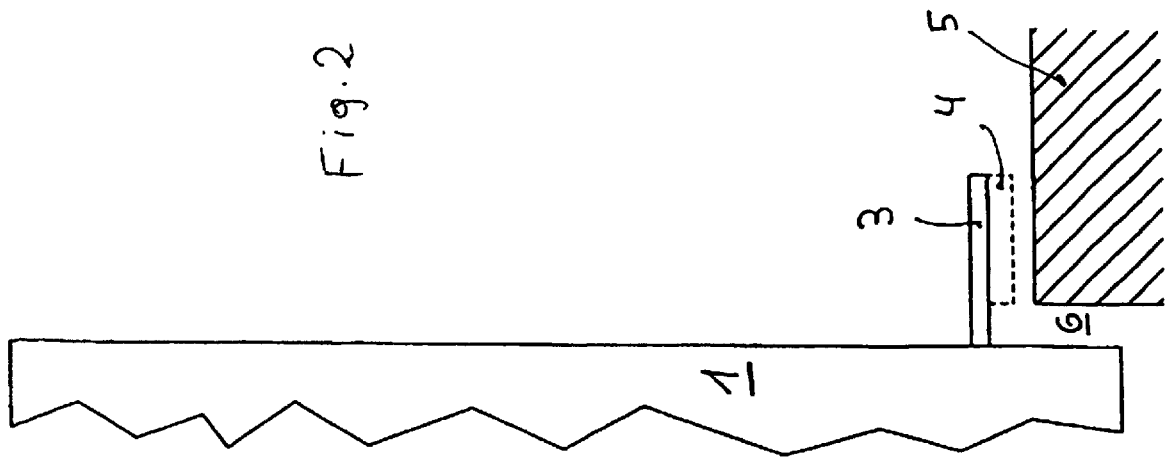
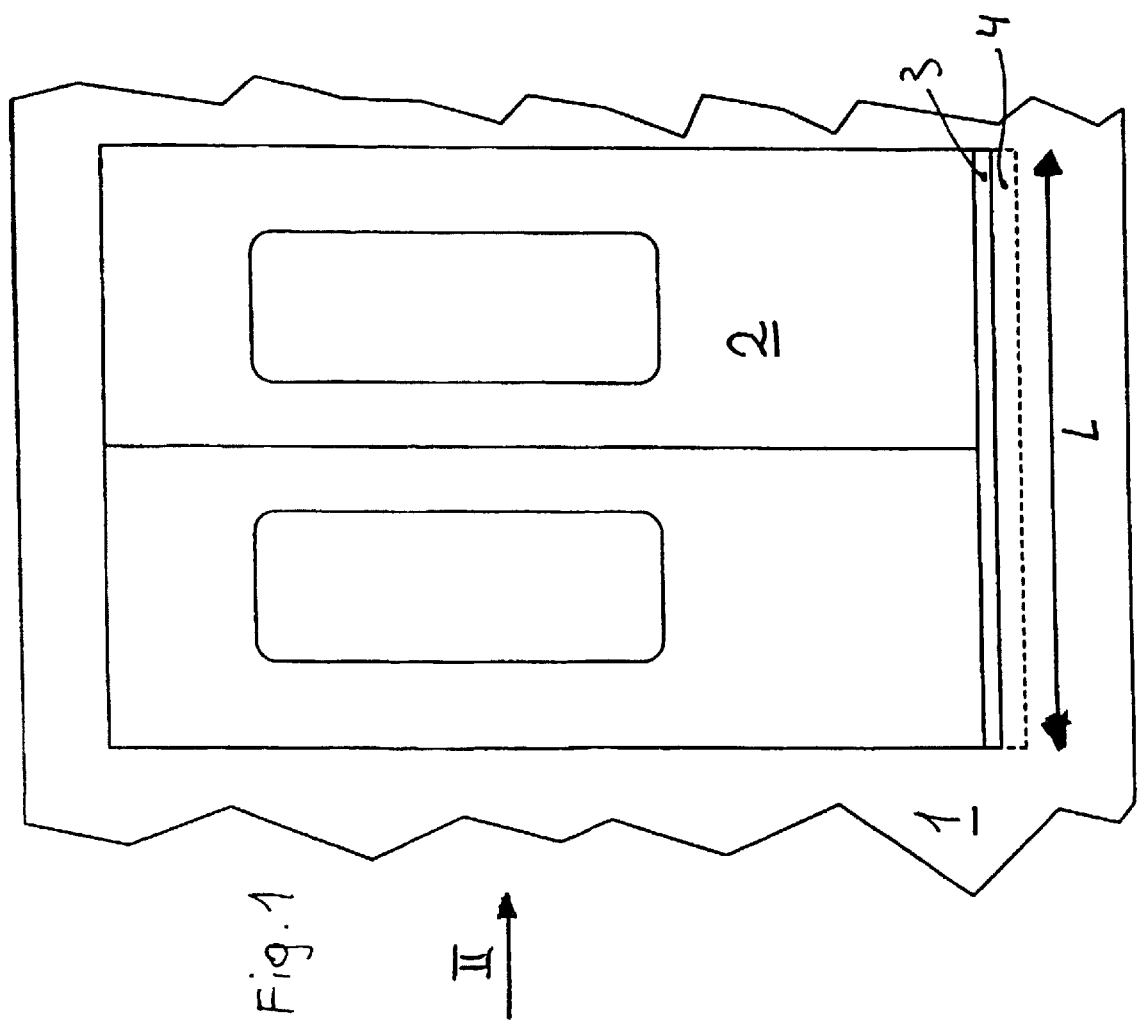

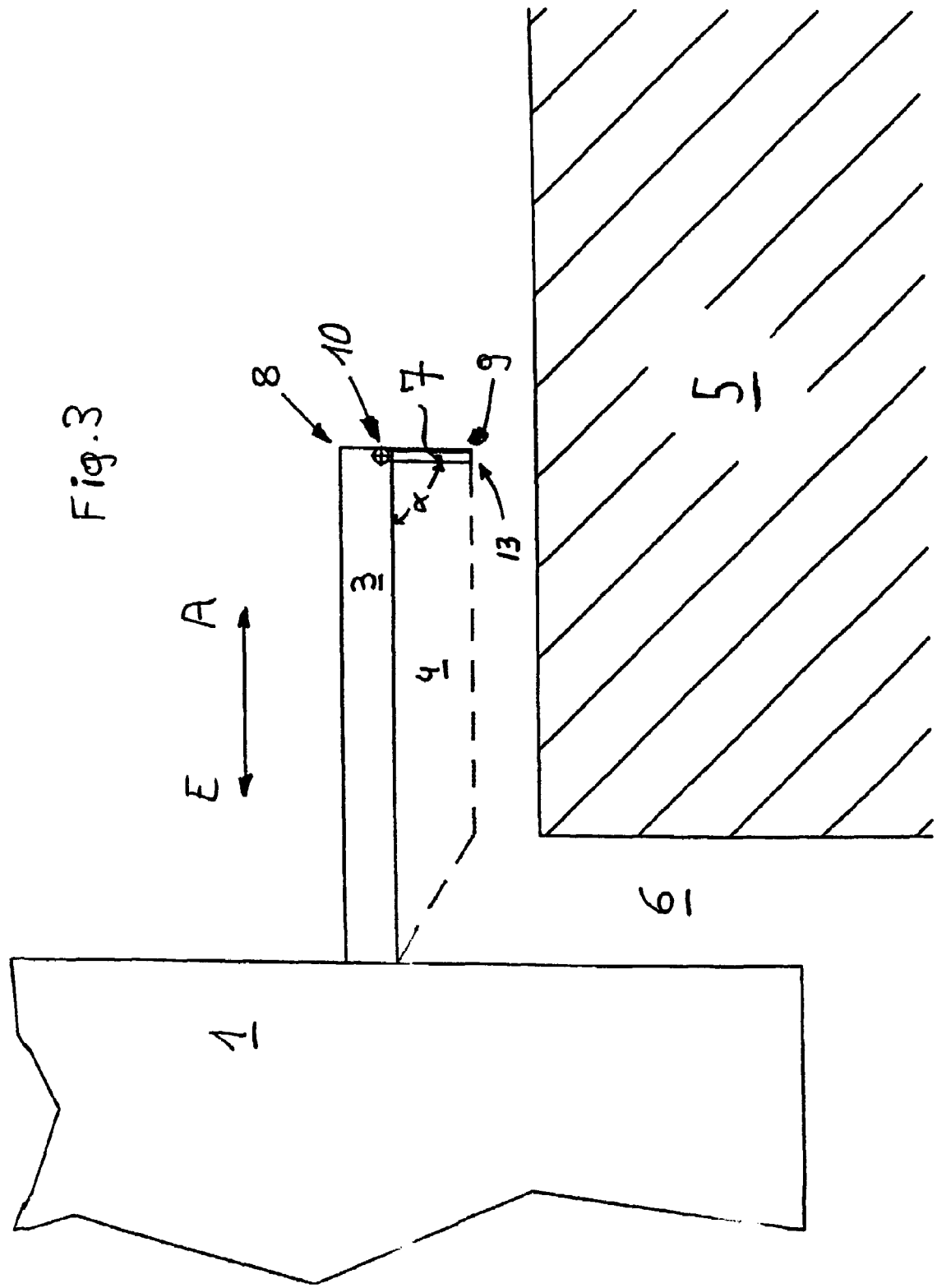

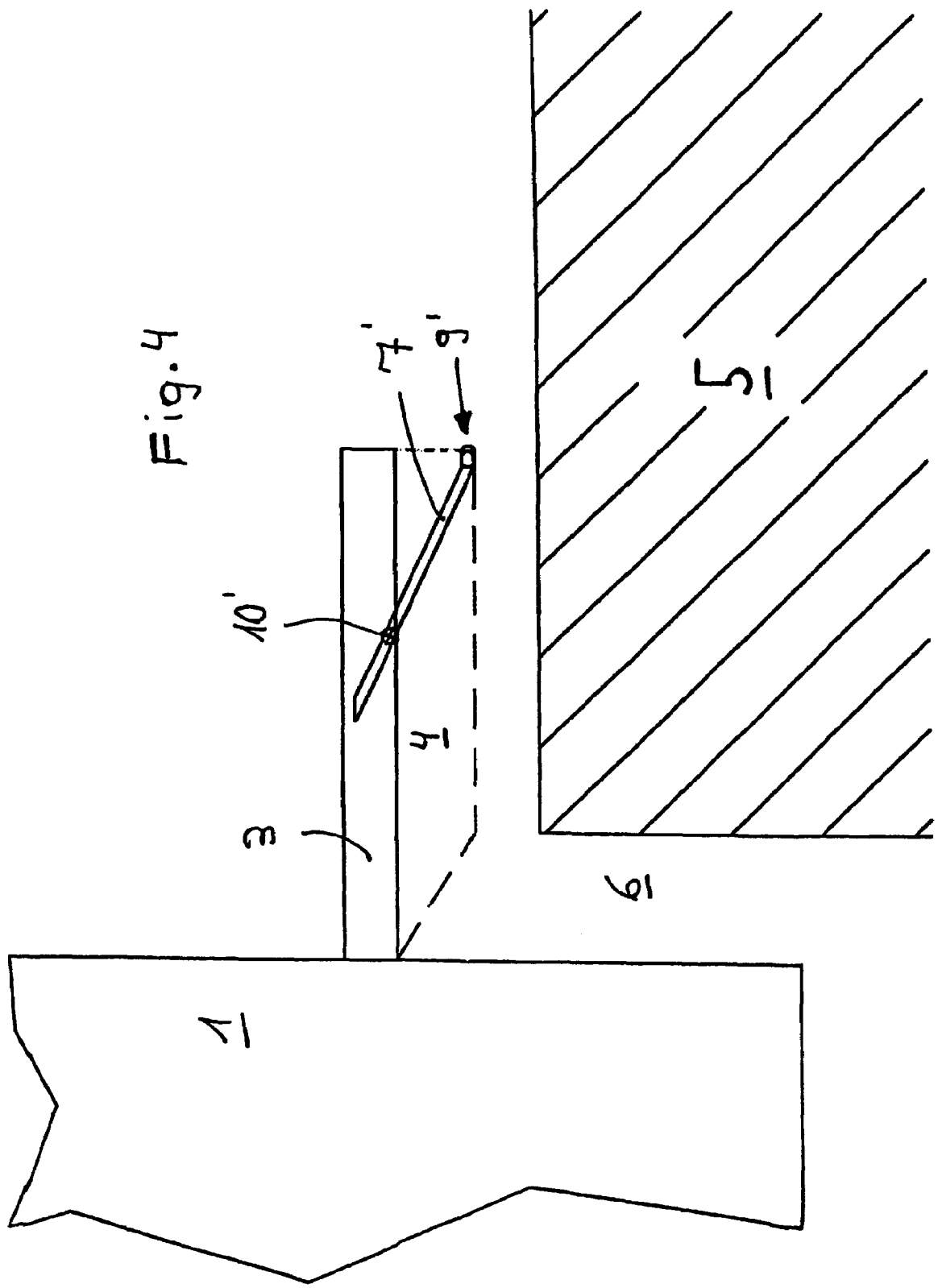

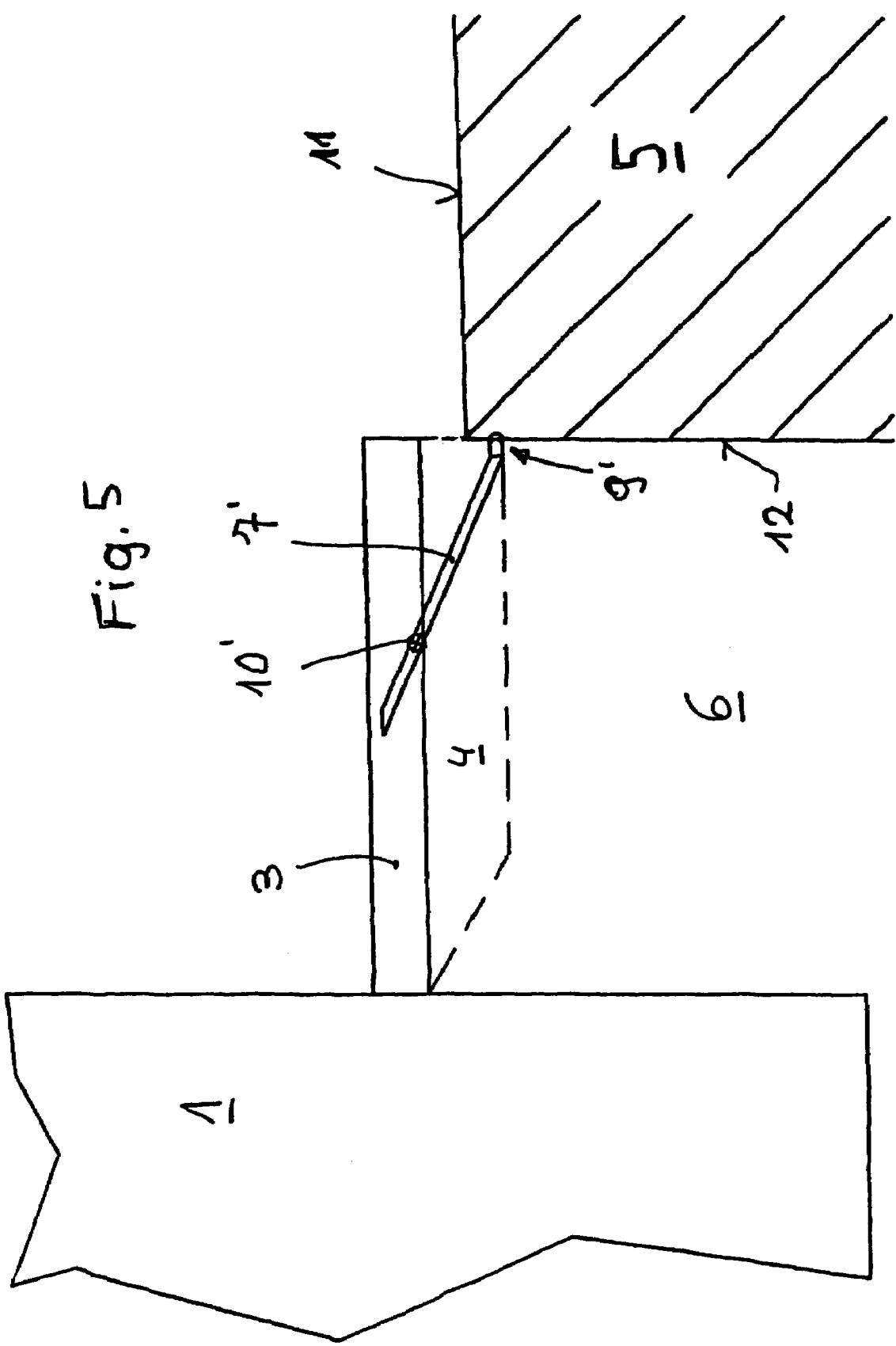

RETRACTABLE STEP

BACKGROUND AND SUMMARY

The present disclosure relates to a retractable step. A retractable step is understood as meaning an entry aid for assisting the entering and exiting of vehicles, particularly rail vehicles. The retractable step has a surface which can be walked upon being extended from the vehicle essentially in a linear direction in order to bridge the gap between the vehicle and the platform or the like.

Depending on the positioning between the vehicle box body and the platform, the retractable step, generally toward the end of its extension movement, comes into the region of the platform. There is the risk of it moving laterally into the essentially vertically extending platform wall. This problem is overcome by sensors in the region of the leading edge of the retractable step.

Another problem is that, in the case of an extended retractable step, a change in height of the retractable step may occur during the time the vehicle spends in the station. This may take place within a short period by the suspension yielding, by the vehicle load changing as passengers get in and out, by the wind load stressing changing, and by more of the same sort of reasons. The greatest possible change in height is defined here by various parameters of the vehicle (type of suspension, position of the stops, length of the lever arms of the retractable step relative to the pivot axis, etc.) and is called maximum change in height below. The actual change in the height position within the context of this maximum change in height may result in luggage or passengers becoming trapped, or the retractable step being damaged if the retractable step is correspondingly lowered. Since the objects at risk generally do not extend over the entire width of the retractable step and it cannot be predicted in which region of the retractable step they are located, detection has hitherto been impossible and the risk of body parts or objects becoming trapped or of the retractable step becoming damaged has had to be accepted.

The present disclosure relates to a device with which it is possible to carry out a detection of the above-mentioned type in a satisfactory and cost-effective manner.

According to the present disclosure, this is achieved in that a strip is connected movably to the retractable step. The strip extends essentially over the entire length of the retractable step and, in the activated state, being located essentially under the front edge of the retractable step. In addition, at least one sensor is provided which detects the position of the strip and/or the force transmitted by the strip to the retractable step.

As a result, every impermissible approach toward the upper side of the platform can be detected as can the imminent risk of an object or body part becoming trapped. The positioning of the strip makes it possible, during the extension of the retractable step, also to detect the space (detection space) in which, during a lowering operation, the retractable step could move and thus makes it possible to safeguard it. An activated state is taken up by the strip at least during the extension of the retractable step.

The movable connection between strip and retractable step makes it possible to bring the strip into the desired position, if appropriate automatically, during the extension of the retractable step. The monitoring of this position remains activated during the extension of the retractable step into its end position.

If a change in the position of the strip is detected, the extension movement is stopped and the retractable step is moved back by a predetermined length by which a safe distance from the object is ensured. In addition, for example, an acoustic and/or optical alarm signal may be emitted. Of course, a different reaction is possible if this is desired by the operator.

The strip itself may either execute an extension movement which is oblique with respect to the direction of extension of the retractable step but is essentially linear. It may also execute a rotational movement and be swung out.

Depending in each case on the design and movement of the strip, a very wide variety of sensors, which can be designed as switches or strain gauges or based on an electrodynamic or piezoelectric effect, are suitable as the actual sensor. The sensors may be arranged either directly in the strip and measure the force between an underlying surface and the strip, or they are accommodated in the region of the bearings of the strip and measure the forces between the strip and retractable step, which forces may originate from the first-mentioned forces.

The transition of the strip from the passive position into the active position can take place by the dead weight of the strip, a slotted-guide mechanism and possibly a spring. Of course, it is also possible to provide a motor drive.

In accordance with the present disclosure, if the retractable step is to be retracted if a trapping risk is established, it is favorable that, during this retraction movement, the strip releases any objects already trapped as rapidly as possible without further loading and does not trap and keep hold of them.

Other aspects of the present disclosure will become apparent from the following descriptions when considered in conjunction with the accompanying drawings.

BRIEF DESCRIPTION OF THE DRAWINGS

FIG. 1 shows a front view of an embodiment of a retractable step, according to the present disclosure.

FIG. 2 shows a partial sectional view in the direction of the arrow II of FIG. 1.

FIG. 3 shows a partial sectional view on an enlarged scale of another embodiment of a retractable step, according to the present disclosure.

FIG. 4 shows a partial sectional view of another embodiment of a retractable step, according to the present disclosure.

FIG. 5 shows the embodiment of FIG. 5 in a different position between the vehicle and the platform.

DETAILED DESCRIPTION

FIG. 1 shows a vehicle 1 with a two-wing door 2 and a retractable step 3. A "detection space" 4, that is a space which is to be monitored by a device, according to the present disclosure, for risk of collision or trapping during the extension of the retractable step 3, is illustrated below the retractable step 3 by dashed lines.

The positioning and significance of detection space 4 are apparent by viewing FIGS. 1 and 2. FIG. 2 shows a platform 5 as it is intended normally to extend with its surface and its side wall in relation to the vehicle 1. Between the platform 5 and the vehicle 1 there is a gap 6. Such a gap 6 may exist in curved track sections and which gap 6 may also be significantly wider than shown. A safe overcoming or overclimbing of such gaps 6 is provided by retractable step 3.

FIG. 3 shows platform 5 on an enlarged scale. In FIG. 3, a strip 7 is provided according to the present disclosure and comprises a rotatable flap, that could also be a bracket or a bracket displaced in a guide, which extends over an entire length L (see FIG. 1) of the retractable step 3. Strip 7 is located essentially below a leading edge 8 of the retractable step 3 when said flap is extended in its activated position, as illustrated in FIG. 3.

The dashed line below the retractable step 3 again indicates the detection space 4. Detection space 4 is the space over which a lower edge 13 of the strip 7 brushes during its extension in the direction A of the double arrow E-A. If, during the extension operation, the front edge 9 of the strip 7 impacts at any point along the length L against an object, this impact is established or detected by at least one sensor. The at least one sensor may measure an angle between the strip 7 and the step 3, for example, angle α as shown in FIG. 3. The at least one sensor may be arranged in a bearing 10 between the strip 7 and the retractable step 3. After a detection, measures or actions are taken by an operator. After reaching an end position of the retractable step 3, the strip 7 folds away and releases or no longer defines the detection space 4.

FIG. 4 shows another embodiment of a retractable step 3 having a strip 7'. The strip 7' is lowered downward about a joint 10'. A sliding movement would be possible in a similar manner. The movement of the strip 7' between the active position shown and a position in which the strip 7' is placed against the retractable step 3 or pushed into recesses (not shown) in a contour (not shown) of the retractable step 3 is brought about by dead weight and/or by assistance by a spring force (not shown). An active movement by a servomotor or the like is also possible.

FIG. 5 shows a situation which may arise during the extension of the retractable step 3, of FIG. 4. A height position of the vehicle 1 relative to platform upper edge 11 is too low, with the result that the strip 7' impacts with its front edge 9' against vertical front 12 of the platform 5 below platform upper edge 11. This is also established or detected by a position sensor in the joint 10' and results in the specified reaction, as mentioned above. The same happens if the strip 7' impacts against a different obstacle (not shown). Instead of the position sensor in the joint 10', a force sensor may be arranged directly on the front edge 9' of the strip 7'.

The present disclosure is not restricted or limited to the exemplary embodiments described and disclosed. It is possible to design the front edges 9, 9' themselves as sensors, whether by these edges 9, 9' carrying profiles which are designed as electric switching strips or which are filled with gas. In the case of the gas, a rising gas pressure when running onto an object is measured and established. Or, the strips 7, 7' may comprise two parts which are movable with respect to each other and the movement of these parts with respect to each other is used as a measure of the striking against an obstacle.

It is important that a strip 7, 7' is arranged in the region below the leading edge 8 of the retractable step 3 and over the entire length 11 of the retractable step 3. It is also important that the load acting on strip 7, 7' in its entirety and/or the position of the strip 7, 7' is established by a sensor, and that, if a specified value is exceeded, the movement of the retractable step 3 is stopped and, if appropriate, an alarm is triggered.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A retractable step for entering and exiting rail vehicles, the retractable step having a surface which can be walked upon and being configured to be extended in an essentially linear direction to bridge a gap between the rail vehicle and a platform, the retractable step comprising:
   a leading edge;
   a strip being movably connected to the retractable step and extending over an entire length L of the retractable step;
   the strip having at least one sensor and arranged to prevent a collision with objects during an extension operation of the retractable step;
   wherein, when the retractable step is in an extended position, the strip is at least partially located under the leading edge and the at least one sensor detects one of the following: (1) a position of the strip relative to the retractable step and (2) a force transferred from the strip to the retractable step; and
   wherein the strip is a rotatable flap.

2. The retractable step of claim 1, wherein the strip is a bracket displaceable in a guide.

3. The retractable step of claim 1, wherein the at least one sensor is fitted to a front edge of the strip.

4. A retractable step for entering and exiting rail vehicles, the retractable step having a surface which can be walked upon and being configured to be extended in an essentially linear direction to bridge a gap between the rail vehicle and a platform, the retractable step comprising:
   a leading edge;
   a strip being movably connected to the retractable step and extending over an entire length L of the retractable step;
   the strip having at least one sensor and arranged to prevent a collision with objects during an extension operation of the retractable step;
   wherein, when the retractable step is in an extended position, the strip is at least partially located under the leading edge and the at least one sensor detects one of the following: (1) a position of the strip relative to the retractable step and (2) a force transferred from the strip to the retractable step; and
   wherein the strip is a rotatable bracket.

5. A retractable step for entering and exiting rail vehicles, the retractable step having a surface which can be walked upon and being configured to be extended in an essentially linear direction to bridge a gap between the rail vehicle and a platform, the retractable step comprising:
   a leading edge;
   a strip being movably connected to the retractable step and extending over an entire length L of the retractable step;
   the strip having at least one sensor and arranged to prevent a collision with objects during an extension operation of the retractable step;
   wherein, when the retractable step is in an extended position, the strip is at least partially located under the leading edge and the at least one sensor detects one of the following: (1) a position of the strip relative to the retractable step and (2) a force transferred from the strip to the retractable step; and
   wherein the at least one sensor measures an angle between the strip and the retractable step.

* * * * *